US012218921B1

(12) United States Patent
Ramirez et al.

(10) Patent No.: US 12,218,921 B1
(45) Date of Patent: *Feb. 4, 2025

(54) CRYPTOGRAPHICALLY PROTECTING DATA TRANSFERRED BETWEEN SPATIALLY DISTRIBUTED COMPUTING DEVICES USING AN INTERMEDIARY DATABASE

(71) Applicant: Allstate Insurance Company, Northbrook, IL (US)

(72) Inventors: Philip Peter Ramirez, Arlington Heights, IL (US); Michael J. Mcnichol, Jr., Warrenville, IL (US); Tao Chen, Northbrook, IL (US); Vincent Quigley, Derry (IE); Brian Rice, Glenavy (IE)

(73) Assignee: Allstate Insurance Company, Northbrook, IL (US)

( * ) Notice: Subject to any disclaimer, the term of this patent is extended or adjusted under 35 U.S.C. 154(b) by 98 days.

This patent is subject to a terminal disclaimer.

(21) Appl. No.: 17/060,903

(22) Filed: Oct. 1, 2020

Related U.S. Application Data

(63) Continuation of application No. 16/413,867, filed on May 16, 2019, now Pat. No. 10,812,457, which is a
(Continued)

(51) Int. Cl.
*H04L 9/40* (2022.01)
*G07C 5/00* (2006.01)
(Continued)

(52) U.S. Cl.
CPC ............ *H04L 63/0464* (2013.01); *G07C 5/00* (2013.01); *H04L 9/00* (2013.01); *H04L 63/0435* (2013.01);
(Continued)

(58) Field of Classification Search
CPC ... H04L 63/0464; H04L 9/00; H04L 63/0435; H04L 63/0442; H04L 63/061; H04L 63/0823; H04L 67/56; G07C 5/00
See application file for complete search history.

(56) References Cited

U.S. PATENT DOCUMENTS

| 4,833,607 A | 5/1989 | Dethloff et al. |
| 5,764,762 A | 6/1998 | Kazmierczak et al. |
(Continued)

FOREIGN PATENT DOCUMENTS

| FR | 2875906 A1 * | 3/2006 | ........ G01M 17/0072 |
| WO | WO-9721111 A1 * | 6/1997 | ........... G01S 13/345 |
(Continued)

OTHER PUBLICATIONS

Mehmet Demir , Blockchain Based Transparent Vehicle Insurance Management , 2019 Sixth International Conference on Software Defined Systems (SDS), Department of Computer Science Ryerson University Toronto, Canada , 8 pages (Year: 2019).*
(Continued)

*Primary Examiner* — Shahriar Zarrineh
(74) *Attorney, Agent, or Firm* — Dinsmore & Shohl LLP

(57) ABSTRACT

Aspects of the disclosure relate to a system and method for cryptographically protecting data transferred between spatially distributed computing devices. An intermediary database may be used to facilitate the protected data transfer and/or record the data transfers. A first computing device may transfer, to the intermediary database, encrypted data that may be securely transferred to other computing devices. A second computing device may generate a GUI used to view data available from the intermediary database. Once data is selected by the second device, the second device may transfer a key (or other encryption mechanism) to the first device. The first computing device may encrypt the data using the received key and transmit the encrypted data to the
(Continued)

intermediary database. The intermediary database may transmit the encrypted data to the second computing device, and the second computing device may decrypt and use the data.

15 Claims, 4 Drawing Sheets

Related U.S. Application Data continuation of application No. 15/180,696, filed on Jun. 13, 2016, now Pat. No. 10,341,309.

(51) Int. Cl.
  *H04L 9/00* (2022.01)
  *H04L 67/56* (2022.01)
(52) U.S. Cl.
  CPC ........ *H04L 63/0442* (2013.01); *H04L 63/061* (2013.01); *H04L 63/0823* (2013.01); *H04L 67/56* (2022.05)

(56) References Cited

U.S. PATENT DOCUMENTS

| | | | |
|---|---|---|---|
| 6,141,621 A | 10/2000 | Piwowarski et al. | |
| 6,449,621 B1 | 9/2002 | Pettovello | |
| 6,480,121 B1* | 11/2002 | Reimann | G08G 1/0962 340/539.1 |
| 6,542,809 B2* | 4/2003 | Hehls, III | G08G 5/0043 342/36 |
| 6,820,204 B1 | 11/2004 | Desai et al. | |
| 7,236,956 B1 | 6/2007 | Ogg et al. | |
| 7,527,288 B2* | 5/2009 | Breed | B60R 21/0132 280/735 |
| 7,933,788 B1 | 4/2011 | Pyatigorsky et al. | |
| 8,370,620 B2 | 2/2013 | Marivoet et al. | |
| 8,560,456 B2 | 10/2013 | Williams | |
| 8,653,953 B2* | 2/2014 | Biondo | G07C 5/085 340/425.5 |
| 8,781,688 B2* | 7/2014 | Sandblom | G01S 13/931 701/1 |
| 8,825,999 B2 | 9/2014 | Mohamed | |
| 8,843,347 B2* | 9/2014 | Safa-Bakhsh | G05B 23/0229 702/183 |
| 8,909,463 B2* | 12/2014 | Chapman | G08G 1/0129 701/119 |
| 9,086,948 B1 | 7/2015 | Slusar et al. | |
| 9,177,427 B1* | 11/2015 | Briggs | G07C 5/00 |
| 9,213,675 B1 | 12/2015 | Kolton et al. | |
| 9,361,607 B1* | 6/2016 | Winiecki | G06Q 30/012 |
| 9,582,943 B1 | 2/2017 | Morrison et al. | |
| 9,688,282 B2 | 6/2017 | Cook et al. | |
| 9,870,562 B2 | 1/2018 | Davis et al. | |
| 9,992,028 B2 | 6/2018 | Androulaki et al. | |
| 10,176,524 B1* | 1/2019 | Brandmaier | G08G 1/0112 |
| 10,182,215 B1 | 1/2019 | Jacob | |
| 10,373,257 B1 | 8/2019 | Iqbal et al. | |
| 10,510,120 B1* | 12/2019 | Roll | G06Q 40/08 |
| 10,949,812 B1* | 3/2021 | Deschepper | G06Q 20/065 |
| 11,126,975 B2* | 9/2021 | Haldenby | H04L 9/0891 |
| 2002/0095337 A1 | 7/2002 | Velthuis et al. | |
| 2004/0039924 A1 | 2/2004 | Baldwin et al. | |
| 2004/0064398 A1* | 4/2004 | Browne | G06Q 40/02 705/37 |
| 2004/0158502 A1 | 8/2004 | Adams et al. | |
| 2004/0266533 A1 | 12/2004 | Gentles et al. | |
| 2007/0027726 A1 | 2/2007 | Warren et al. | |
| 2007/0047809 A1* | 3/2007 | Sasaki | G06V 10/56 382/170 |
| 2007/0101136 A1 | 5/2007 | Lai et al. | |
| 2007/0190501 A1 | 8/2007 | Brown et al. | |
| 2007/0243808 A1* | 10/2007 | Mathur | B60H 3/0085 454/75 |
| 2008/0140509 A1 | 6/2008 | Amjadi | |
| 2009/0192941 A1 | 7/2009 | Fournier et al. | |
| 2010/0027769 A1 | 2/2010 | Stevens et al. | |
| 2010/0131308 A1* | 5/2010 | Collopy | G06Q 30/04 701/31.4 |
| 2010/0238037 A1 | 9/2010 | Bristow et al. | |
| 2010/0325050 A1 | 12/2010 | Ito et al. | |
| 2011/0213628 A1 | 9/2011 | Peak et al. | |
| 2011/0238191 A1 | 9/2011 | Kristjansson et al. | |
| 2012/0105489 A1* | 5/2012 | Monroe | G06F 16/444 345/684 |
| 2012/0173629 A1 | 7/2012 | Drope | |
| 2012/0277900 A1 | 11/2012 | Catoen | |
| 2012/0277957 A1* | 11/2012 | Inoue | B60W 30/12 701/41 |
| 2012/0331529 A1 | 12/2012 | Ibel et al. | |
| 2013/0091351 A1 | 4/2013 | Manges | |
| 2013/0173910 A1 | 7/2013 | Hong et al. | |
| 2013/0174838 A1 | 7/2013 | Youngblood | |
| 2013/0204645 A1 | 8/2013 | Lehman et al. | |
| 2013/0339240 A1 | 12/2013 | Anderson et al. | |
| 2014/0012604 A1 | 1/2014 | Allen, Jr. | |
| 2014/0191886 A1 | 7/2014 | Barrett | |
| 2014/0201057 A1 | 7/2014 | Shuster | |
| 2014/0324704 A1 | 10/2014 | Blankenbeckler et al. | |
| 2014/0344015 A1 | 11/2014 | Puertolas-Montanes et al. | |
| 2015/0057976 A1 | 2/2015 | Yang et al. | |
| 2015/0105972 A1 | 4/2015 | Madison et al. | |
| 2015/0120567 A1* | 4/2015 | Van Rooyen | G06F 21/00 705/59 |
| 2015/0127940 A1 | 5/2015 | Polehn et al. | |
| 2015/0158345 A1* | 6/2015 | Kavarana | G07C 5/08 701/33.9 |
| 2015/0158347 A1* | 6/2015 | Fritz | B60C 23/0408 340/442 |
| 2015/0170192 A1 | 6/2015 | Santaella et al. | |
| 2015/0205929 A1 | 7/2015 | Brama | |
| 2015/0220928 A1 | 8/2015 | Allen | |
| 2015/0228004 A1* | 8/2015 | Bednarek | G06Q 30/0633 705/26.8 |
| 2015/0233718 A1 | 8/2015 | Grokop | |
| 2015/0237492 A1 | 8/2015 | Huang et al. | |
| 2015/0254463 A1 | 9/2015 | Ryhorchuk et al. | |
| 2015/0262137 A1 | 9/2015 | Armstrong | |
| 2015/0324789 A1 | 11/2015 | Dvorak et al. | |
| 2015/0332283 A1 | 11/2015 | Witchey | |
| 2015/0348169 A1 | 12/2015 | Harris et al. | |
| 2015/0379510 A1 | 12/2015 | Smith | |
| 2016/0012424 A1* | 1/2016 | Simon | G06Q 20/36 705/67 |
| 2016/0019614 A1 | 1/2016 | Dziuk | |
| 2016/0035348 A1 | 2/2016 | Kleindienst et al. | |
| 2016/0050272 A1 | 2/2016 | Raduchel | |
| 2016/0086175 A1 | 3/2016 | Finlow-Bates et al. | |
| 2016/0189146 A1 | 6/2016 | Cattone | |
| 2016/0191243 A1 | 6/2016 | Manning | |
| 2016/0217532 A1* | 7/2016 | Slavin | G06Q 30/0276 |
| 2016/0239672 A1 | 8/2016 | Khan et al. | |
| 2016/0253622 A1 | 9/2016 | Sriram et al. | |
| 2016/0254910 A1* | 9/2016 | Finlow-Bates | H04L 9/0891 713/158 |
| 2016/0259637 A1* | 9/2016 | Kumar | G06F 8/65 |
| 2016/0260171 A1 | 9/2016 | Ford et al. | |
| 2016/0261685 A1 | 9/2016 | Chen et al. | |
| 2016/0263998 A1* | 9/2016 | Induni | G01S 19/14 |
| 2016/0292672 A1 | 10/2016 | Fay et al. | |
| 2016/0294707 A1 | 10/2016 | Chen | |
| 2016/0294783 A1 | 10/2016 | Piqueras Jover et al. | |
| 2016/0308855 A1 | 10/2016 | Lacey et al. | |
| 2016/0321654 A1* | 11/2016 | Lesavich | H04L 67/104 |
| 2016/0330027 A1 | 11/2016 | Ebrahimi | |
| 2016/0330180 A1 | 11/2016 | Egorov et al. | |
| 2016/0335596 A1 | 11/2016 | Richie et al. | |
| 2016/0341559 A1* | 11/2016 | Camisa | G07C 5/008 |
| 2016/0342994 A1 | 11/2016 | Davis | |
| 2016/0358161 A1 | 12/2016 | Cobban et al. | |
| 2016/0358165 A1 | 12/2016 | Maxwell | |
| 2016/0364920 A1* | 12/2016 | Nelson | G07C 5/085 |

(56) References Cited

U.S. PATENT DOCUMENTS

| | | |
|---|---|---|
| 2017/0017936 A1 | 1/2017 | Bisikalo et al. |
| 2017/0046652 A1* | 2/2017 | Haldenby ............. G06Q 20/065 |
| 2017/0046792 A1 | 2/2017 | Haldenby et al. |
| 2017/0054611 A1 | 2/2017 | Tiell |
| 2017/0140375 A1 | 5/2017 | Kunstel |
| 2017/0154331 A1 | 6/2017 | Voorhees |
| 2017/0177898 A1 | 6/2017 | Dillenberger |
| 2017/0180128 A1 | 6/2017 | Lu |
| 2017/0180134 A1 | 6/2017 | King |
| 2017/0180367 A1* | 6/2017 | Warren ............... H04L 63/0823 |
| 2017/0192423 A1* | 7/2017 | Rust ..................... G05D 1/0238 |
| 2017/0206523 A1 | 7/2017 | Goeringer et al. |
| 2017/0207917 A1 | 7/2017 | Davis |
| 2017/0228731 A1 | 8/2017 | Sheng et al. |
| 2017/0236121 A1 | 8/2017 | Lyons et al. |
| 2017/0243213 A1* | 8/2017 | Castinado ............. H04W 12/06 |
| 2017/0243286 A1 | 8/2017 | Castinado et al. |
| 2017/0279801 A1 | 9/2017 | Andrade |
| 2017/0344988 A1 | 11/2017 | Cusden et al. |
| 2017/0357966 A1 | 12/2017 | Chandrasekhar et al. |
| 2018/0088571 A1* | 3/2018 | Weinstein-Raun .......................... G05D 1/0027 |
| 2018/0095638 A1 | 4/2018 | Merg et al. |
| 2018/0176017 A1 | 6/2018 | Rodriguez et al. |
| 2018/0227293 A1 | 8/2018 | Uhr et al. |
| 2018/0268626 A1 | 9/2018 | Arashima et al. |
| 2018/0316651 A1 | 11/2018 | Yang et al. |
| 2018/0349938 A1 | 12/2018 | Ericson |
| 2019/0212909 A1 | 7/2019 | Napier et al. |

FOREIGN PATENT DOCUMENTS

| | | | | |
|---|---|---|---|---|
| WO | WO-2013087759 A1 * | 6/2013 | ............. | G01P 21/02 |
| WO | 2015171580 A1 | 11/2015 | | |

OTHER PUBLICATIONS

"Introducing Slur;" http://slur.io/; Mar. 8, 2016.

"Blockchain Technology Development and Programming;" RISKebiz; http://www.riskebiz.com/#!solutions/c17b1; Mar. 8, 2016.

Wilkinson, Shawn, et al., "MetaDisk—A Blockchain-Based Decentralized File Storage Application;" http://metadisk.org/metadisk.pdf; Dec. 23, 2014.

Mainelli, Michael, et al., "Chain of a Lifetime: How Blockchain Technology Might Transform Personal Insurance;" http://www.longfinance.net/images/Chain_Of_A_Lifetime_December2014.pdf; Dec. 2014.

"The Evolving Focus of the Blockchain in Insurance;" https://www.insly.com/en/blog/the-evolving-focus-of-the-blockchain-in-insurance; Dec. 16, 2015.

Redman, Jamie; "Keybase: File Sharing with Bitcoin Blockchain Encryption;" https://news.bitcoin.com/keybase-file-sharing-bitcoin-blockchain-encryption/; Feb. 7, 2016.

"Block chain (database)—Wikipedia, the free encyclopedia;" https://en.wikipedia.org/wiki/Block_chain_(databasd); Mar. 3, 2016.

"Cryptography—From Wikipedia, the free encyclopedia;" https://en.wikipedia.org/wiki/Cryptography#Modern_cryptography; Apr. 13, 2016.

"Run Code on Encrypted Data: Secure Data & Protect Privacy Without Compromising Functionality;" http://enigma.media.mit.edu/; Mar. 3, 2016.

Zyskind, Guy et al., "Enigma: Decentralized Computation Platform with Guaranteed Privacy;" Accessed Mar. 3, 2016.

"How Does Bitcoin Work?" https://bitcoin.org/en/how-it-works; Mar. 3, 2016.

"Rootstock;" http://www.rootstock.io/; Mar. 3, 2016.

Ethereum Frontier—What is Ethereum? https://www.ethereum.org/; Mar. 3, 2016.

R3 Introduces Global Collaborative Labs with Largest Scale Blockchain Experiment to-Date; Accessed Jun. 13, 2016.

Mar. 21, 2018—(US) Non-Final Office Action—U.S. Appl. No. 15/180,696.

Sep. 13, 2018—(US) Final Office Action—U.S. Appl. No. 15/180,696.

Feb. 21, 2019—(US) Notice of Allowance—U.S. Appl. No. 15/180,696.

Sep. 30, 2019—(US) Non-Final Office Action—U.S. Appl. No. 16/413,867.

"An Incentive Attached Peer to Peer Electronic Coupon System", Taiki Shojima, Studies in Information and Control, vol. 13, No. 4, pp. 233-242, Dec. 2004, Year 2004.

"A Secure E-Coupon System for Mobile User", Chin-Chen Chang, IJCSNS International Journal of Computer Science and Network Security, vol. 6, No. 1, pp. 273-280, Jan. 2006, Year 2006.

Mar. 2, 2020—(US) Final Office Action—U.S. Appl. No. 16/413,867.

Jun. 23, 2020—(US) Notice of Allowance—U.S. Appl. No. 16/413,867.

* cited by examiner

CRYPTOGRAPHICALLY PROTECTING DATA TRANSFERRED BETWEEN SPATIALLY DISTRIBUTED COMPUTING DEVICES USING AN INTERMEDIARY DATABASE

CROSS REFERENCE TO RELATED APPLICATIONS

This application is a continuation of U.S. patent application Ser. No. 16/413,867, filed May 16, 2019, entitled "Cryptographically Protecting Data Transferred Between Spatially Distributed Computing Devices Using an Intermediary Database," which is a continuation of U.S. patent application Ser. No. 15/180,696, filed Jun. 13, 2016, entitled "Cryptographically Protecting Data Transferred Between Spatially Distributed Computing Devices Using an Intermediary Database," now U.S. Pat. No. 10,341,309 issued on Jul. 2, 2019. Each of the aforementioned applications is incorporated herein by reference in its entirety.

TECHNICAL FIELD

Aspects of the disclosure generally relate to cryptographically protecting data transferred between spatially distributed computing devices using an intermediary database.

BACKGROUND

Data may be transferred from one computing device to another computing device, in exchange for other data or for an incentive. However, existing systems for exchanging data between devices might not be properly secured. Moreover, the various computing devices might not be able to determine what data, among the plethora of data, is available for transfer, such as in networks having many different devices and data sources.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a system and method for receiving, at a first computing device and from a plurality of sensors, sensor data. The first computing device may process the sensor data to generate processed data. The first computing device may encrypt, using a first encryption key, the processed data to generate first encrypted data. The first computing device may transmit, to an intermediary database, the first encrypted data encrypted using the first encryption key. In some aspects, the intermediary database may comprise a block chain. After receiving a selection, by a second computing device, of the first encrypted data, the first computing device may receive, from the second computing device, a second encryption key. The first computing device may encrypt, using the second encryption key, the processed data to generate second encrypted data. The first computing device may transmit, to the intermediary database, the second encrypted data encrypted using the second encryption key.

In some aspects, the first computing device may receive, from the intermediary database, the first encrypted data responsive to the selection of the first encrypted data. The first computing device may decrypt, using the first encryption key, the first encrypted data received from the intermediary database to generate decrypted data. In these examples, encrypting the processed data to generate the second encrypted data may comprise encrypting the decrypted data using the second encryption key to generate the second encrypted data.

In some aspects, metadata used to describe the first encrypted data encrypted using the first encryption key may be generated. The first computing device may transmit, to the intermediary database, the metadata used to describe the first encrypted data. The plurality of sensors may comprise at least one sensor of a mobile computing device associated with a user and at least one sensor of a vehicle associated with the user. Moreover, processing the sensor data may comprise generating a driving score for the user based on the sensor data received from the at least one sensor of the mobile computing device and the at least one sensor of the vehicle.

In some aspects, the first encryption key may comprise a private key associated with the first computing device, and the second encryption key may comprise a public key associated with the second computing device. The first computing device may transmit, to the second computing device, a third encryption key. The third encryption key may comprise a public key associated with the first computing device. The first computing device may receive an encrypted incentive encrypted using the third encryption key. The incentive may be associated with the second encrypted data encrypted using the second encryption key. The first computing device may decrypt, using a private key corresponding to the public key associated with the first computing device, the encrypted incentive.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
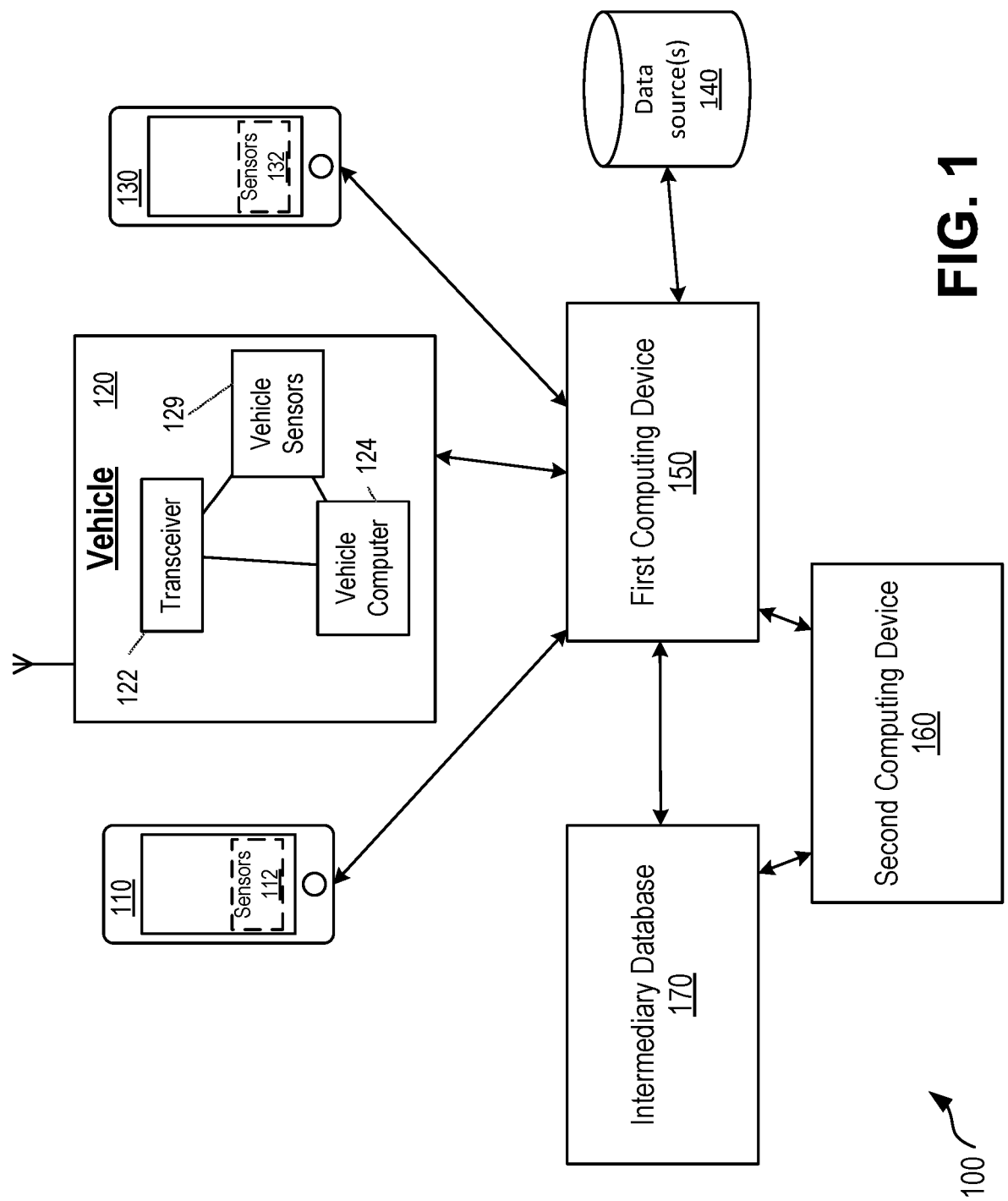
FIG. 1 is a diagram illustrating various example components of a system for cryptographically protecting data transferred between spatially distributed computing devices using an intermediary database according to one or more aspects of the disclosure.

FIG. 1 is a diagram illustrating various example components of a system 100 for cryptographically protecting data transferred between spatially distributed computing devices using an intermediary database according to one or more aspects of the disclosure. The system 100 may include one or more sources of data, such as mobile devices 110 or 130 (e.g., a smartphone, a tablet, and the like), vehicle 120, and/or data source(s) 140. The system 100 may also comprise a first computing device 150, a second computing device 160, and one or more other computing devices (not illustrated). The system 100 may comprise an intermediary database 170, which may be used to cryptographically protect data transferred between computing devices at different locations, such as between the first computing device 150 and the second computing device 160. Each component of the system 100 may comprise a computing device (or system) having some or all of the following structural components.

For example, each computing device 150, 160 may have a processor for controlling overall operation of the computing device 150, 160 and its associated components, including RAM, ROM, input/output module, and memory. Each computing device 150, 160, along with one or more additional devices, may correspond to any of multiple systems or devices, configured as described herein for providing data to be transferred and/or receiving data transferred data using the intermediary database 170 and cryptographically protecting the transferred data.

Each computing device 150, 160 may include an Input/Output (I/O) module having a microphone, keypad, touch screen, and/or stylus through which a user of the computing device 150, 160 may provide input, and may also include one or more of a speaker for providing audio input/output and a video display device for providing textual, audiovisual and/or graphical output. Software may be stored within the memory of the computing device and/or other storage to provide instructions to its processor for enabling the computing device 150, 160 to perform various functions. For example, the computing device's memory may store software used by the device 150, 160, such as an operating system, application programs, and an associated internal or external database. The memory unit may include one or more of volatile and/or non-volatile computer memory to store computer-executable instructions, data, and/or other information. The processor of each computing device 150, 160 and its associated components may allow the computing device to execute a series of computer-readable instructions to cryptographically protect transferred data. One or more application programs used by the computing device 150, 160 may include computer executable instructions (e.g., cryptographic data protection instructions, and the like) for cryptographically protecting transferred data and performing other related functions as described herein.

Each computing device 150, 160 may operate in a networked environment supporting connections to one or more other computing devices, such as various other terminals/devices. Each computing device 150, 160, and the related terminals/devices, may communicate with one or more mobile devices 110 or 130, vehicles 120, other data sources 140, and/or an intermediary database 170. Thus, the computing devices 150, 160 and each of their associated terminals/devices may include personal computers (e.g., laptop, desktop, or tablet computers) and/or servers (e.g., web servers, database servers) and may communicate with mobile communication devices (e.g., mobile phones, portable computing devices, and the like).

The devices illustrated in system 100 may communicate via network connections depicted such as a local area network (LAN) and a wide area network (WAN), and a wireless telecommunications network, but may also include other networks. When used in a LAN networking environment, the computing devices 150, 160 may be connected to the LAN through a network interface or adapter. When used in a WAN networking environment, each of the computing devices 150, 160 may include a modem or other means for establishing communications over the WAN, such as a network (e.g., the Internet). When used in a wireless telecommunications network, the computing device 150 or 160 may include one or more transceivers, digital signal processors, and additional circuitry and software for communicating with wireless computing devices (e.g., mobile phones, vehicles, etc.) via one or more network devices (e.g., base transceiver stations) in the wireless network. It will be appreciated that the network connections shown and described above are illustrative and other means of establishing a communications link between the computers may be used. The existence of any of various network protocols such as TCP/IP, Ethernet, FTP, HTTP and the like, and of various wireless communication technologies such as GSM, CDMA, LTE, Wi-Fi, and WiMAX, is presumed, and the various computing devices and system components described herein may be configured to communicate using any of these network protocols or technologies.

The system 100 may also include a vehicle 120, containing some or all of the hardware/software components of the computing devices 150 and/or 160 described above. The vehicle 120 may be, for example, an automobile, motorcycle, scooter, bus, recreational vehicle, boat, or other vehicle for which sensor data may be collected and analyzed. The vehicle computer 124 may receive sensor data from sensors 129 of the vehicle 120. For example, vehicle computer 124 may receive accelerometer data from an accelerometer in the vehicle 120. Sensors 129 may include, for example, telematics devices integrated with the vehicle 120 and/or aftermarket telematics devices. The telematics devices may be used to track location, vehicle diagnostics, speed, acceleration, rotation, and the like.

The vehicle 120 may include a communication system 122. The communication system 122 may comprise a short-range transceiver, such as a vehicle-based data transmission system, configured to transmit vehicle data to other nearby vehicles, and to receive vehicle data from other nearby vehicles. In some examples, the transceiver 122 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, the communication system 122 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces.

The vehicle-to-vehicle (V2V) transmissions between the communication system 122 and another vehicle's communication system may be sent via DSRC, Bluetooth, satellite, GSM infrared, LTE, IEEE 802.11, WiMAX, RFID, and/or any suitable wireless communication media, standards, and protocols. In certain systems, the communication system 122 may include specialized hardware installed in vehicle 120 (e.g., transceivers, antennas, etc.), while in other examples the communication system 122 may be implemented using existing vehicle hardware components (e.g., radio and satellite equipment, navigation computers).

The range of V2V communications between vehicle communication systems may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 120 to any other vehicle, or other infrastructure device capable of receiving the communication, within the range of the vehicle's transmission capabilities. For example, a vehicle 120 may periodically broadcast (e.g., every 0.1 second, every 0.5 seconds, every second, every 5 seconds, etc.) certain vehicle data via its short-range communication system 122, regardless of whether or not any other vehicles or reception devices are in range. In other examples, a vehicle communication system 122 may first detect nearby vehicles and receiving devices, and may initialize communication with each by performing a handshaking transaction before beginning to transmit its vehicle data to the other vehicles and/or devices.

The types of vehicle data transmitted by the vehicle 120 may depend on the protocols and standards used for the V2V communication, the range of communications, and other factors. In certain examples, the vehicle 120 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 120 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, windshield wipers, etc.). Vehicle warnings such as detection by the vehicle's 120 internal systems that the vehicle is skidding, that an impact has occurred, or that the vehicle's airbags have been deployed, also may be transmitted in V2V communications.

The vehicle 120 may transmit data from its sensors (e.g., vehicle sensors 129) to the first computing device 150 (or another computing device) via the transceiver 122. The computing device 150 and the vehicle may be associated with the same user, such as the driver of the vehicle 120. In other examples, the first computing device 150 may be associated with an insurance provider or other entity. The driver's driving data may be sent to the first computing device 150, which may be used to facilitate secured transfer of the data to other computing devices, such as the second computing device 160, as will be described in further detail below. Exemplary sensor data from the vehicle sensors 129 include speed data (e.g., from a speedometer of the vehicle 120), acceleration data (e.g., from an accelerometer of the vehicle 120), vehicle operation data (e.g., from a microcomputer of the vehicle 120), rotational data (e.g., from a gyroscope of the vehicle 120), GPS data (e.g., from a GPS device of the vehicle 120), cellular or other wireless data (e.g., from a transceiver of the vehicle 120), or any other sensor data. As described above, the transceiver 122 may comprise a short-range transceiver. Additionally or alternatively, the transceiver 122 may comprise a long-range transceiver, such as a cellular signal transceiver, or any other type of long-range transceiver.

The system 100 may include one or more mobile computing device 110 or 130 (e.g., mobile phones, personal digital assistants (PDAs), tablet computers, laptop computers, smartwatches, etc.). The mobile computing device 110 or 130 may contain some or all of the hardware/software components of the computing devices 150, 160 described above. The mobile computing device 110 and mobile computing device 130 may comprise the same mobile computing device or different and separate mobile computing devices. In some aspects, the mobile computing devices 110 and 130 may be associated with a user, such as the driver of the vehicle 120. Software applications may be installed on and execute on the mobile device 110 or 130. The software applications may be configured to receive sensor data from internal sensors 112 or 132, such as acceleration, velocity, location, rotation, and the like. For example, mobile device 110 equipped with Global Positioning System (GPS) functionality may determine vehicle location, speed, direction and other driving data and might not need to communicate with vehicle sensors or external vehicle systems for the data. In some examples, the software application on the mobile device 110 may be configured to receive some or all of the sensed data collected by sensors 129 of the vehicle 120.

When the mobile computing device 110 is within the vehicle 120, the mobile computing device 110 may be used to sense vehicle or other driving data. The mobile computing device 110 may store, analyze, and/or transmit the vehicle data to one or more other computing devices. For example, mobile device 110 may transmit vehicle data directly to the computing device 150, and thus may be used instead of or in addition to sensors or communication systems of the vehicle 120.

The mobile device 110 may include various sensors 112 capable of detecting and recording conditions at and operational parameters of the vehicle 120 if the mobile device 110 is inside the vehicle. The sensors 112 may be used to sense, for example, the location of the mobile device 110, such as the GPS coordinates (e.g., latitude and longitude). The location of the mobile device 110 may also be determined based on wireless networks the mobile device has connected to, such as Wi-Fi networks, cellular networks, and the like.

The sensors 112 of the mobile device 110, such as a GPS and/or a compass, may sense the speed and/or direction at which the mobile device 110 and accordingly vehicle 120 is traveling. An accelerometer of the mobile device 110 may sense the acceleration of the mobile device. A gyroscope may be used to determine the orientation of the mobile device. The gyroscope may also be used to measure the speed of rotation of the mobile device 110. A magnetometer may be used to measure the strength and direction of the magnetic field relative to the mobile device. The sensors 112 previously described are exemplary, and the mobile device 110 may include any other sensors used for monitoring driving characteristics and other driving data.

As previously described, the mobile computing device 130 may be the same as the mobile computing device 110, but the data collected from the mobile computing device 130 may be different in different circumstances. For example, driving data may be collected from the mobile computing device when it is inside the vehicle, and non-driving data may be collected from the mobile computing device when it is not inside the vehicle. Other examples of data collected from the mobile computing device(s) in different situations will be described in further detail below. The mobile computing device 130 may alternatively be a different device from the mobile computing device 110. For example, the mobile computing device 110 may be a smartphone associated with the user, and the mobile computing device 130 may be a laptop or tablet associated with the user.

The system 100 may comprise one or more data source 140, such as an external data source. Each data source 140 may comprise one or more database storing data associated with the user. In some aspects, the driving or non-driving data collected from the vehicle 120 and/or mobile computing device(s) 110 or 130 may be transmitted to and stored at the external data source 140. The external data source 140 may also store other data associated with the user and not collected from the vehicle or mobile computing devices. Non-limiting examples of data include, for example, insurance data (e.g., risk score data), exercise data (e.g., biometric exercise data), social media data (e.g., contact list, favorite content, etc.), or any other data describing or otherwise associated with the user. The data may comprise any data the user is willing to or otherwise share with other entities, such as an entity associated with the second computing device 160. Data from the external data sources 140 may be accessed by the first computing device 150 via, for example, open application program interfaces (APIs), databases, software development kits (SDKs), and/or mobile device to mobile device communication.

The system 100 may include an intermediary database 170, which may contain some or all of the hardware/software components of the computing devices 150, 160 described above. The intermediary database 170 may be used as, for example, a digital marketplace that facilitates cryptographically protecting data transferred between spatially distributed computing devices, such as the first computing device 150 and the second computing device 160. The intermediary database 170 may be used as a block chain or other type of public ledger to record transactions and data related to the transactions. The first computing device 150 may transfer, to the intermediary device 170, encrypted data that a user of the first computing device 150 desires to securely sell or transfer to other computing devices, such as the second computing device 160. The second computing device 160 may view (or be used to view), on the intermediary device 170, data available for purchase. Once a purchase of data is made by the second computing device 160, the second computing device 160 may transfer a key (or other encryption mechanism) to the first computing device 150 for encrypting the purchased data. The first computing device 150 may encrypt the data using the key received from the second computing device 160 and transfer the encrypted data to the intermediary database 170. The intermediary database 170 may transfer the encrypted data to the second computing device 160, and the second computing device 160 may decrypt and use the data. Similar data transfers may be performed between numerous other computing devices using the intermediary database 170. Additional examples and steps performed by the various devices and components illustrated in FIG. 1 will be described in detail below.

Figure 2:
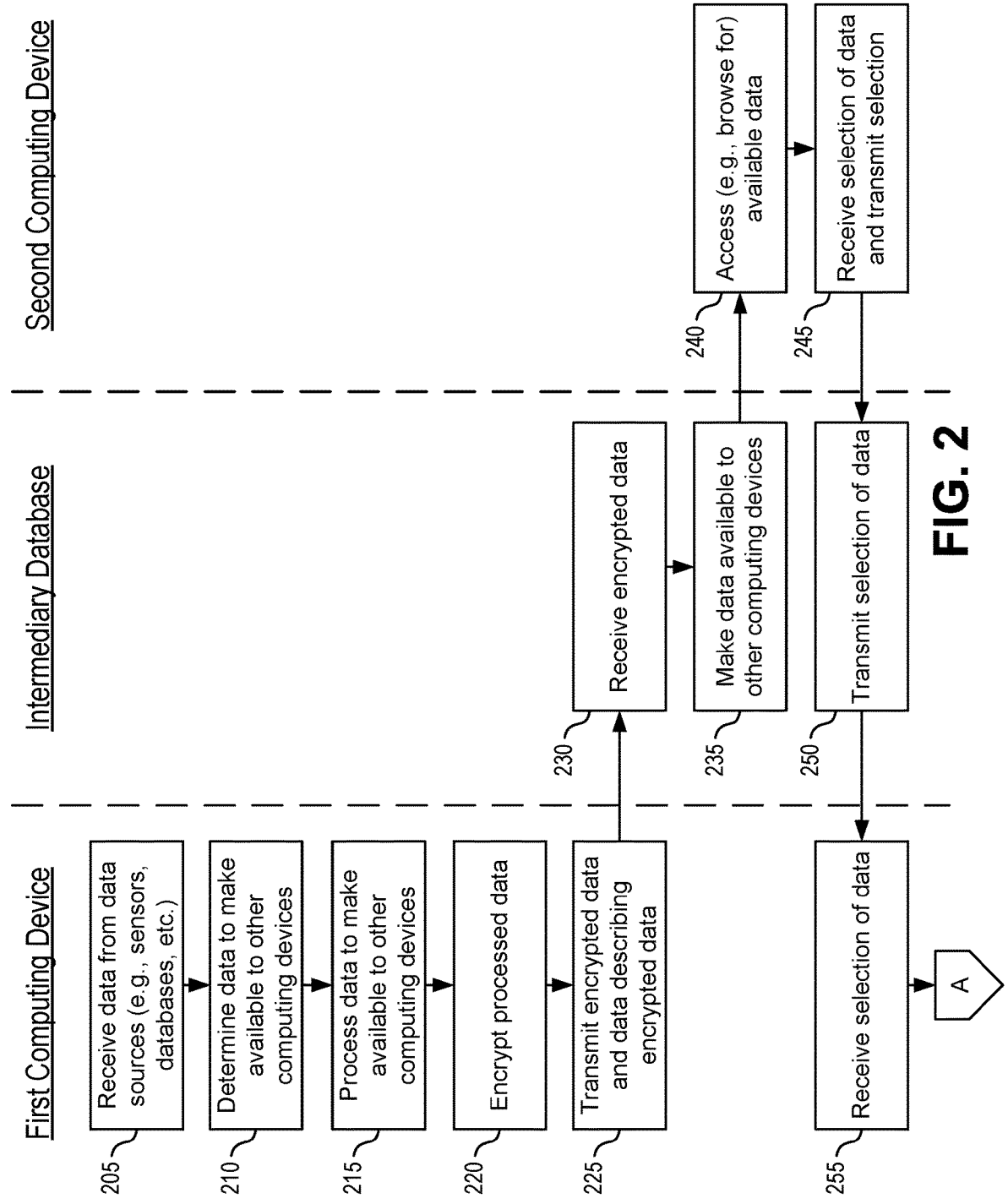
FIG. 2 is a flow diagram illustrating an example method of cryptographically protecting data transferred between spatially distributed computing devices using an intermediary database according to one or more aspects of the disclosure.

FIG. 2 is a flow diagram illustrating an example method of cryptographically protecting data transferred between spatially distributed computing devices using an intermediary database according to one or more aspects of the disclosure. The steps illustrated in FIG. 2 may be performed by one or more of the devices illustrated in FIG. 1, such as the first computing device 150, the intermediary database 170, and/or the second computing device 160.

In step 205, the first computing device (which may be associated with a user desiring to sell or otherwise transfer data to another entity) may receive data from one or more data sources (e.g., sensors, vehicles, databases, user devices, such as smartphones or tablets, and the like). The data received by the first computing device may comprise any data that the user associated with the first computing device desires to sell or otherwise securely transfer to other entities and/or their computing devices, such as the second computing device 160. The first computing device may receive data from the mobile computing device 110, the mobile computing device 130, the vehicle 120, the external data source 140, and/or any other data sources. In some aspects, the received data may include driving data, such as telematics data. The driving data may indicate the driving behavior for the user, such as driving speed (e.g., current driving speed or past driving speed, average driving speed, maximum driving speed, and the like), acceleration or braking events while driving, driving routes taken by the user, time of day user typically drives (e.g., during daylight or at night), types of roads driven (e.g., highway vs. secondary roads), windshield wiper use, headlight use, etc. Additional examples of telematics or driving data may comprise vehicle location, vehicle driving mode (e.g., autonomous or manual), vehicle usage (e.g., as a private vehicle, as a ride-share vehicle, as a cab, etc.), the fuel efficiency of the vehicle (e.g., real-time fuel efficiency), the driver's attentiveness or distraction levels, real-time weather data during trips by the vehicle, etc. The driving data may be received from the mobile computing device 110, vehicle 120, and/or the external data source 140.

In some aspects, the received data may comprise non-driving data, such as the user's exercise data (e.g., biometric exercise data), social media data (e.g., contact list, favorite content, etc.), or any other data describing or otherwise associated with the user. Non-driving data may be collected from the user's mobile computing devices (e.g., non-driving phone data, such as location data, e.g., GPS location data, cellular location data, Wi-Fi location data). Additional examples of non-driving data may include health data, such as body temperature, heart rate, blood pressure, blood glucose levels, etc.

In the examples above, exemplary data that the user desires or intends to transfer to other entities comprise existing data, such as past or present data already collected by one or more of the data sources illustrated in FIG. 1. The user may also desire or intend to transfer data that has not yet been created, such as future data. For example, a user may sell all of (or a subset of) the driving data about the user collected in a future timeframe (e.g., driving data collected over the next 60 days, driving data collected over the next year, etc.). The user may desire to sell or otherwise transfer non-driving data in a similar manner.

In step 210, the first computing device may determine data to make available to other computing devices, via the intermediary database. The user may select the data that the user is willing to share and thus have control over the transfer and sharing of his or her data. In some aspects, the user may select the type of data the user is willing to share, such as driving data or non-driving data (e.g., social media data or biometric exercise data). The user may additionally or alternatively select which data sources the user is willing to transfer. For example, the user may desire to sell driving data collected from the vehicle and the mobile computing device 110 (e.g., collected while the mobile computing device 110 is inside the vehicle 120 and collecting driving data). On the other hand, the user might not desire to sell non-driving or driving data collected from other sources. In some aspects, the processor of the first computing device may cause the display of the first computing device to display a graphical user interface that lists one or more of the data or data sources available to other entities. The user may make his or her selection of data (and from which data sources) to sell or otherwise make available for sale to other entities via the graphical user interface.

In step 215, the first computing device may process the data to make available to other computing devices. Processing the data may comprise certification and/or validation of data, e.g., to determine whether the data is true and of high quality data or to convert the data to data of true and/or high quality. For example, the data may be processed so that it is more readable by other entities, such as businesses desiring to purchase the data. By processing the data, the owner of the data may be able to sell the data at a greater price knowing that the data is certified and/or validated by a trusted entity. While processing the data is described as being performed by the first computing device, the intermediary database may similarly be used to process the data alone or in combination with the first computing device.

In some aspects, the first computing device may certify and/or validate the source(s) of the data. For example, sensor data may be received from several different sensors and/or devices integrated with the vehicle 120 or from sensors in the mobile computing device(s) 110 or 130. A database may be used to maintain one or more lists of validated source(s) of data and/or not validated source(s) of data, such as by manufacturer (e.g., OEMs, such as Manufacturer 1, Manufacturer 2, etc.), by device or sensor model (e.g., Smartphone Model 1, Tablet Model 6, V2V Radio Model 4, Gyroscope Model 1, etc.), by device or sensor type (e.g., accelerometer, gyroscope, magnetometer, proximity sensor, speedometer, GPS, cellular radios, Wi-Fi radios, etc.), among other validation schemes. Some of the data sources listed above might be validated, and other data sources might not be validated. The proper indication of validated or not validated may be stored in the database, and the first computing device may determine whether the data to make available comes from a validated source or not.

The first computing device may additionally or alternatively process the data to determine the type of data being made available, such as acceleration data, speed data, location data, data indicating hard braking, driver risk score data, etc. The first computing device may generate a textual description usable by other computing devices to identify the type of data and the quality of data (e.g., whether the data is validated or not). In some aspects, the first computing device may prompt the user for a textual description of the data (e.g., fitness data for the user from the past 30 days, driving data from the past 4 months, etc.). Additionally or alternatively, the first computing device may generate the textual description based on one or more keywords provided by the user. For example, if the user inputs "fitness" and "30 days," the first computing device may generate a textual description of "fitness data for the User from the past 30 days."

Processing the data may additionally or alternatively comprise combining data from one or more data sources to generate additional data. For example, the first computing device may receive sensor data from the mobile computing device 110 and/or the vehicle 120, and the sensor data may be indicative of one or more driving characteristics for the driver. For example, location sensor data may indicate one or more driving routes taken by the user. Data from accelerometers, speedometers, gyroscopes, and GPS may indicate the driver's speed, acceleration, braking habits, and the like. The first computing device may combine the data to generate a driving score (e.g., a risk score) for the user. A higher driving score may indicate a safer driver (e.g., more gentle braking habits, more regularly driving within the speed limit, using less risky driving routes, etc.), and a lower driving score may indicated a more risky driver. The first computing device may provide other levels of granularity, such as by combining the data to indicate, for example, the number or percentage of times that the driver applied the brakes abruptly or gently, the number of car crashes involving the driver, etc. Accordingly, other entities may buy the data raw (e.g., raw sensor data) or the data can be processed before it is exchanged (e.g., a driving score, what caused a high or low driving score, braking habits, etc.).

In step 220, the first computing device may encrypt one or more of the processed data. In some aspects, the data may be encrypted such that only the first computing device (and/or other trusted devices granted access to the data) can decrypt the data. For example, the first computing device may encrypt the data with a key, such as a symmetric key, that the first computing device can access. Other devices, such as the second computing device and the intermediary database, might not have access to the key and accordingly cannot decrypt the data. Thus, the first computing device may place the data on a database accessible by other entities, such the intermediary database, in a secure manner.

In some aspects, some of the data uploaded to the intermediary database might be encrypted and some of the data might not be encrypted. For example, underlying driving data and sensor or device data may be encrypted, whereas the textual description of the data might not be encrypted. Thus, the intermediary database and computing devices having access to the intermediary database (e.g., prospective buyers) may be able to determine the type of data for sale, the user associated with the data, and whether the data is validated or not.

In step 225, the first computing device may transmit the encrypted data and the data describing the encrypted data (e.g., metadata) to the intermediary database. The intermediary database (e.g., a data marketplace or exchange) may be used to allow a user of the first computing device to store and/or sell (or otherwise transfer) data in a secured environment. That is, the user may monetize his or her information by the intermediary database connecting the user to data buyers, such as businesses. The intermediary database may be used as a platform for consolidating data sources and facilitating the transfer of data from those data sources. Accordingly, a transactional, immutable, and/or transparent ecosystem may be used to encourage and reward active sharing of information.

In step 230, the intermediary database may receive the encrypted data and the metadata from the first computing device. As previously explained, the intermediary database may comprise a block chain or other type of public ledger indicating (e.g., broadcasting) transactions (e.g., data available for sale, data sold or exchanged, etc.). The intermediary database may record each transaction as an entry (e.g., a block added to a block chain). For example, one or more transaction may be placed on a block, and the new block may be placed next to a previous transaction block. In some aspects, each block may comprise all of the transactions performed or completed during a predetermined time frame (e.g., by day, hour, minute, etc.). By using a block chain or other public leger, transparency and trust may be maintained. In some aspects, individual data or data associated with particular computing devices (e.g., first computing device) or users may be pulled from its corresponding block, as will be described in further detail below. The intermediary database may reside in the cloud (e.g., a network of computing devices), which might not be a block chain.

In step 235, the intermediary database may make the data received from the first computing device available to other computing devices. That is, the intermediary database may store data received from data sellers (e.g., a user of the first computing device) and be used to facilitate transparent transactions. For example, computing devices (e.g., data buyers and/or sellers) having access to the intermediary database may be able to access the intermediary database to view information for each transaction performed via the intermediary database. Exemplary viewable information includes the type and amount of data sold and/or the selling price. This information may be used by one or more computing devices to accurately price the data on the intermediary database.

In step 240, a second computing device may access (e.g., browse for) available data in the intermediary database. In some aspects, the second computing device may be associated with (e.g., used by) an entity interested in purchasing data, such a business entity. The intermediary database may provide one or more graphical user interfaces (GUIs) that would allow the second computing device to browse for data available for sale, such as encrypted data uploaded by the first computing device. The GUI(s) may also display the description of the available data, such as the textual data as previously described. The second computing device and associated GUI(s) displayed on the second computing device may be used to search for specific types of data. For example, a user may input into, via the second computing device, a search string to search for driving data or fitness data. The user may search for data from users in specific geographical markets, such as a state (e.g., Illinois), a region (e.g., Midwest), a city (e.g., Chicago), etc. The user may also indicate whether processed data or raw data is preferred. In some aspects, the second computing device may automatically search for desired data (e.g., without user input).

In step 245, the second computing device may receive a selection of data of interest, such as from a user of the second computing device, and transmit the selection to the intermediary database. That is, once the second computing device has found data of interest, the second computing device may transmit an indication to the intermediary database that its associated entity desires to purchase the data. For example, the second computing device may transmit an indication that its associated entity desires to purchase the data uploaded by the first computing device. The indication may also include an indication of the incentive (e.g., monetary or non-monetary incentive) that the data buyer will give to the seller in exchange for the data. For example, the incentive may be money or an insurance discount to the data owner.

In some aspects, the second computing device may secure (e.g., encrypt) the incentive and transmit the secured incentive to the intermediary database. For example, the second computing device may encrypt the incentive with a key, such as a symmetric key, that the second computing device can access. Other devices, such as the first computing device and the intermediary database, might not have access to the key and accordingly cannot decrypt the incentive. Accordingly, the second computing device may place the incentive on a database accessible by another entity, such the intermediary database, in a secure manner. In these examples, the intermediary database may be used to store both the data for sale from the first computing device and the incentive from the second computing device.

In step 250, the intermediary database may receive the selection (and optionally the secured incentive) and transmit (e.g., forward) the selection to the party that provided the data, such as the first computing device. In step 255, the first computing database may receive the selection of the data from the intermediary database. The user of the first computing device, such as a consumer, may be notified (e.g., via a GUI displayed on the first computing device or another device associated with the user) of the selection made by the second computing device. The selection may comprise, for example, an offer for the user's data. That is, the user may be notified that a business is willing to pay a certain amount (or otherwise incentivize the user) for the user's data.

The user may provide, via a GUI displayed on a display of the first computing device, an input accepting or declining the selection (e.g., offer) made by the second computing device. For example, the user may agree to the incentive offered by the business. In some aspects, the offer may be automatically accepted or declined based on the user's configuration choices (e.g., privacy, price, etc.). That is, if the user's conditions are met (e.g., the second computing device's offer is equal to or greater than the list price for the user's data), the offer may be automatically accepted. The use of automatic transactions may eliminate processing overhead. The ecosystem described above may give consumers the chance to shop their data around and be rewarded for their participation in the intermediary database. Once an offer has been accepted, the first computing device, the intermediary database, and the second computing device may be used to facilitate the exchange of the data for the incentive.

Figure 3:
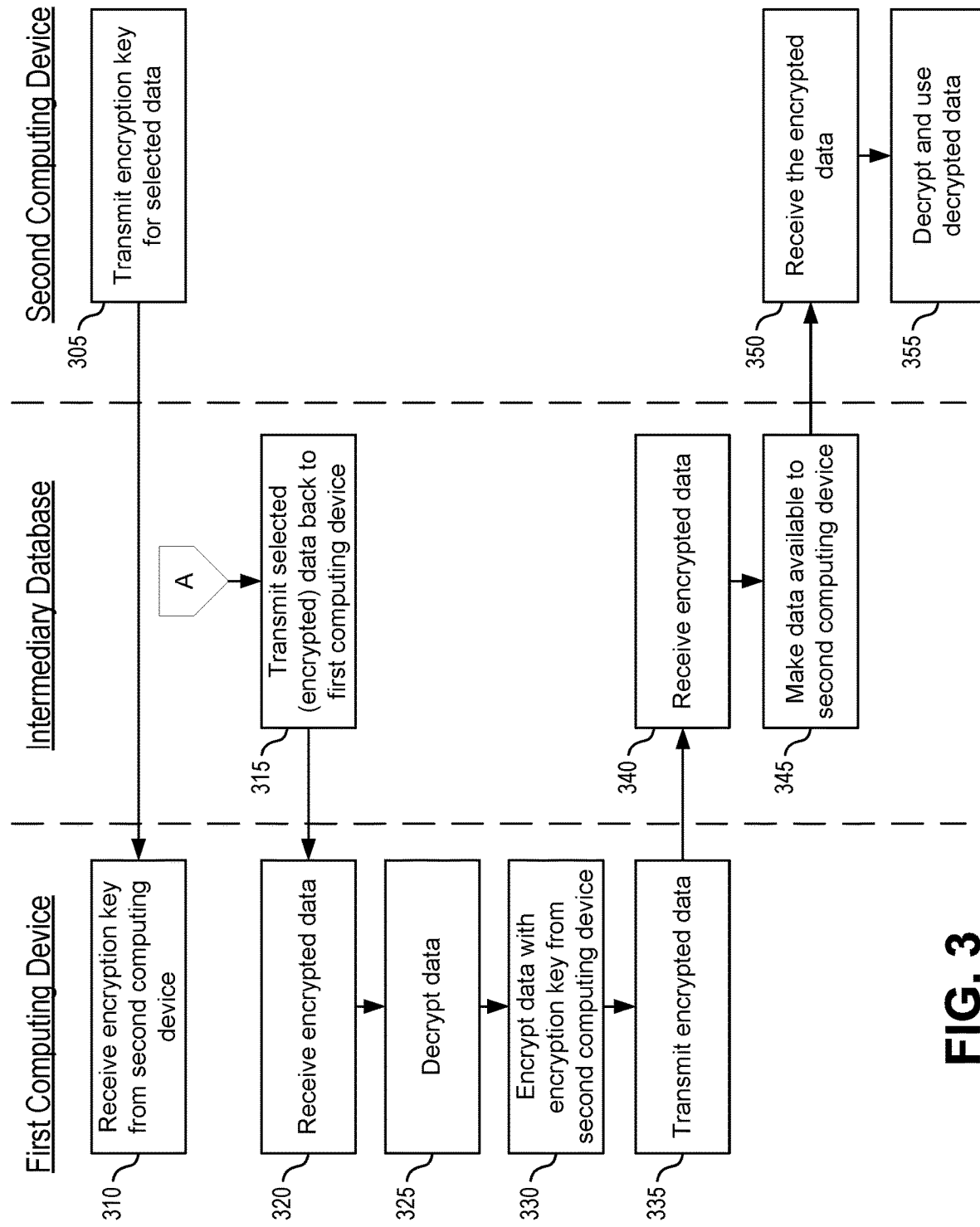
FIG. 3 is a flow diagram illustrating an example method of cryptographically protecting data transferred between spatially distributed computing devices using an intermediary database according to one or more aspects of the disclosure.

FIG. 3 is a flow diagram illustrating an example method of cryptographically protecting data transferred between spatially distributed computing devices using an intermediary database according to one or more aspects of the disclosure. The steps illustrated in FIG. 3 may be performed by one or more of the devices illustrated in FIG. 1, such as the first computing device, the intermediary database, and/or the second computing device.

In step 305, the second computing device may transmit an encryption key for the data selected by the second computing device. In some aspects, the encryption key may comprise a public key, such as a public key of a public key/private key pair. As will be described in further detail below, the public key may be used by other computing devices, such as the first computing device, to encrypt data being transmitted to the second computing device, and the second computing device may use a corresponding private key to decrypt the data. In some examples, the second computing device may transmit the public key directly to the first computing device. In other examples, the second computing device may transmit the public key to the intermediary database, and the intermediary database may forward the public key to the first computing device.

In step 310, the first computing device may receive the encryption key (e.g., public key) from the second computing device. In some aspects, the encryption key may optionally be transmitted through the intermediary database. As will be described in further detail below, the encryption key from the second computing device may be used by the first computing device to encrypt the selected data before it is transmitted securely to the second computing device.

While not illustrated, the first computing device may similarly transmit, to the second computing device, an encryption key for the incentive. For example, the first computing device may transmit its public key to the second computing device, and the second computing device may use the first computing device's public key to encrypt the incentive before sending the incentive to the first computing device. The first computing device may have the corresponding private key to decrypt the encrypted incentive.

In step 315, the intermediary database may transmit the selected (and encrypted) data back to first computing device. In some aspects, the transmission may occur in response to a user request at the first computing device for the encrypted data and/or in response to a determination that an exchange between the first and second computing devices has been initiated or finalized.

In step 320, the first computing device may receive the encrypted data from the intermediary database. As previously explained, the data may have been encrypted using, for example, a private key of the first computing device. Accordingly, other computing devices, such as the intermediary database and the second computing device might not be able to decrypt the data uploaded to the intermediary database by the first computing device. In step 325, the first computing device may decrypt the received data. For example, the first computing device may use a private key (or any other method) to decrypt the data previously uploaded to the intermediary database.

In step 330, the first computing device may encrypt (e.g., re-encrypt) the data with the encryption key received from the second computing device. For example, if the second computing device transmitted a public key (e.g., in step 305) to the first computing device, the first computing device may use the public key to encrypt the data purchased by the entity associated with the second computing device.

In step 335, the first computing device may transmit (e.g., upload) the encrypted data to the intermediary database. Step 335 may be similar to step 225 previously described, except the data is encrypted with the second computing device's public key, rather than the first computing device's private key. The data encrypted with the second computing device's public key may be hashed for added security. By encrypting the data with the second computing device's public key, devices other than the second computing device (e.g., the intermediary database or other computing devices having access to the intermediary database) cannot decrypt the data, unless they have access to the private key.

In step 340, the intermediary database may receive, from the first computing device, the data encrypted with the second computing device's public key. The encrypted data may be stored on the intermediary database. In step 345, the intermediary database may make the encrypted data available to the second computing device.

In step 350, the second computing device may receive the encrypted data from the intermediary database. For example, second computing device may send, to the intermediary database, a request for the encrypted data, and the intermediary database may send the encrypted data responsive to the request. In some aspects, the intermediary database might not wait for the second computing device's request and might automatically transmit the encrypted data after it has been received from the first computing device.

In step 355, the second computing device may decrypt the data. For example, if the data was encrypted using the second computing device's public key, the second computing device may decrypt the data with the corresponding private key. The second computing device may use the data for one or more purposes. While not illustrated, the second computing device may similarly transmit the incentive (which may be encrypted with the first computing device's public key) to the intermediary database. The intermediary database may transmit the encrypted incentive to the first computing device, and the first computing device may decrypt the received incentive using its private key. Accordingly, the intermediary database may facilitate the exchange of data and incentives among numerous parties. In some aspects, the intermediary database may also receive an incentive for facilitating the exchange or transaction between the first computing device and the second computing device. For example, the intermediary database might receive a 1% fee of the overall value of the transaction.

The transaction between the first computing device and the second computing device may be recorded at the intermediary database, and the recording may be available to the public and/or other computing devices having access to the intermediary database. For example, the transaction may be added to a block, and the block may be added to the chain of blocks if the intermediary database comprises a blockchain. The electronic recordation may include, for example, the type of data sold, the incentive exchanged, the parties involved (e.g., the first computing device and/or the second computing device), the time of the transaction, and the like. The intermediary database and/or other computing devices may use the information recorded to properly price data for future transactions.

Figure 4:
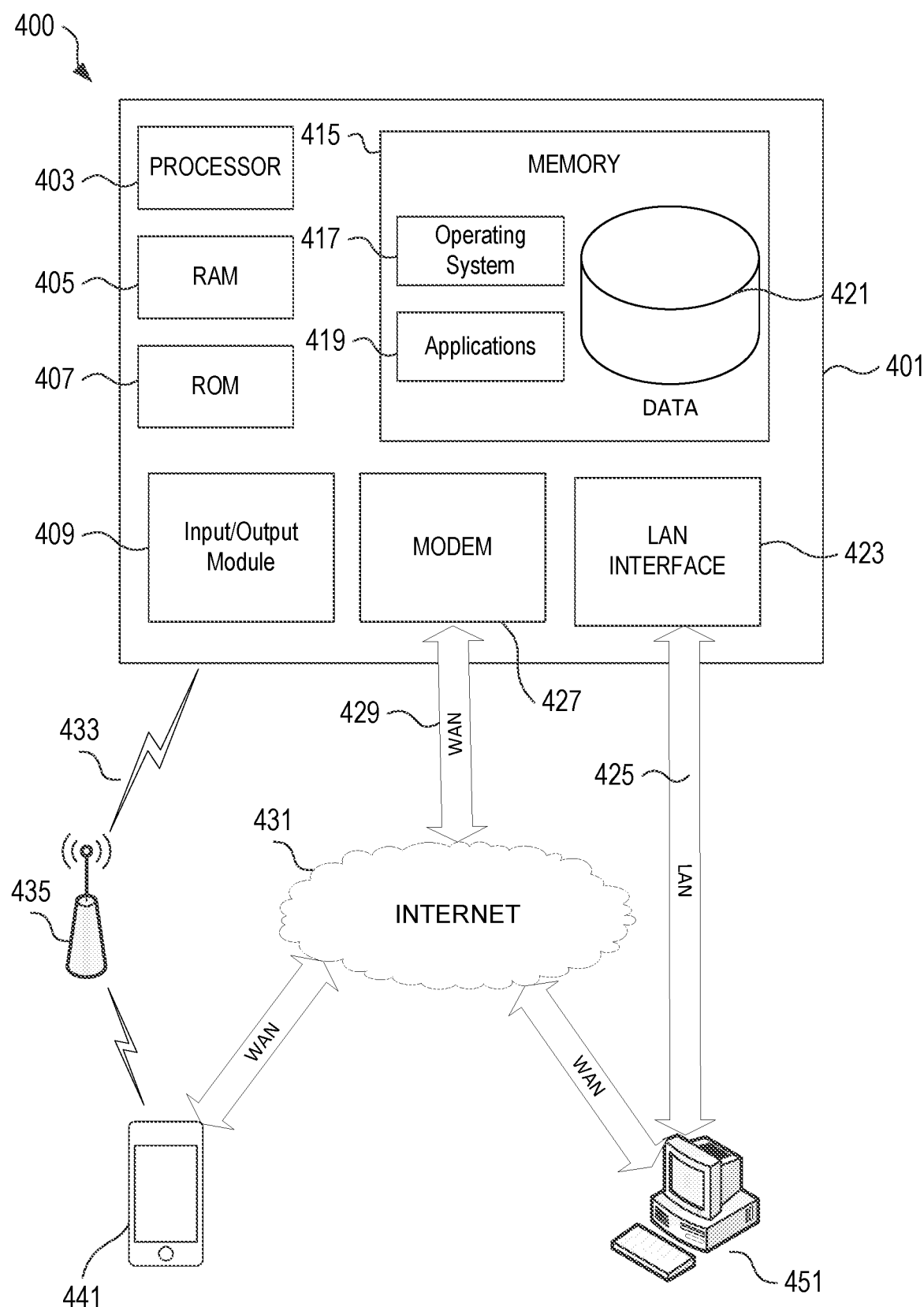
FIG. 4 illustrates a network environment and computing systems that may be used to implement aspects of the disclosure.

FIG. 4 illustrates a block diagram of a computing device 401 in a spatially distributed computing system 400 that may be used according to one or more illustrative embodiments of the disclosure. The computing device 401 may have a processor 403 for controlling overall operation of the computing device 401 and its associated components, including RAM 405, ROM 407, input/output module 409, and memory unit 415. The computing device 401, along with one or more additional devices (e.g., terminals 441, 451) may correspond to any of multiple systems or devices, such as spatially distributed computing devices or systems, configured as described herein for cryptographically protecting data transferred between spatially distributed computing devices using an intermediary database.

Input/Output (I/O) module 409 may include a microphone, keypad, touch screen, and/or stylus through which a user of the computing device 401 may provide input, and may also include one or more of a speaker for providing audio input/output and a video display device for providing textual, audiovisual and/or graphical output. Software may be stored within memory unit 415 and/or other storage to provide instructions to processor 403 for enabling device 401 to perform various functions. For example, memory unit 415 may store software used by the device 401, such as an operating system 417, application programs 419, and an associated internal database 421. The memory unit 415 includes one or more of volatile and/or non-volatile computer memory to store computer-executable instructions, data, and/or other information. Processor 403 and its associated components may allow the computing device 401 to execute a series of computer-readable instructions to cryptographically protect data transferred between spatially distributed computing devices using an intermediary database.

The computing device 401 may operate in a networked environment 400 supporting connections to one or more remote computers, such as terminals/devices 441 and 451. The computing device 401, and related terminals/devices 441 and 451, may include devices installed in ground, air, or space vehicles or mobile devices that are configured to receive and process image and external data. Thus, the computing device 401 and terminals/devices 441 and 451 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 401. The network connections depicted in FIG. 4 include a local area network (LAN) 425 and a wide area network (WAN) 429, and a wireless telecommunications network 433, but may also include other networks. When used in a LAN networking environment, the computing device 401 may be connected to the LAN 425 through a network interface or adapter 423. When used in a WAN networking environment, the device 401 may include a modem 427 or other means for establishing communications over the WAN 429, such as network 431 (e.g., the Internet). When used in a wireless telecommunications network 433, the device 401 may include one or more transceivers, digital signal processors, and additional circuitry and software for communicating with wireless computing devices 441 (e.g., mobile phones, short-range vehicle communication systems, vehicle sensing and telematics devices) via one or more network devices 435 (e.g., base transceiver stations) in the wireless network 433.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and spatially distributed computing device components described herein may be configured to communicate using any of these network protocols or technologies.

Additionally, one or more application programs 419 used by the computing device 401 may include computer executable instructions (e.g., cryptographic algorithms, and the like) for cryptographically protecting data transferred between spatially distributed computing devices using an intermediary database.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
receiving, by a first computing device associated with a first entity and from a plurality of sensors, sensor data, the sensor data comprising speed data;
processing the sensor data to generate processed speed data and a textual description, wherein the processing comprises generating a textual description indicating that the speed data and the source of the speed data is validated;
encrypting the processed speed data by a first encryption key associated with the first computing device to generate first encrypted speed data, wherein the textual description is not encrypted;
transmitting, to an intermediary database, the first encrypted speed data and the unencrypted textual description;
receiving, via the intermediary database and from a second computing device associated with a second entity, a selection of the first encrypted speed data and indication of exchange data comprising information regarding an incentive as exchange data for the exchange of the first encrypted speed data, wherein the selection of the first encrypted speed data was based on identifying, by the second computing device, speed data indicated by the unencrypted textual description;
based on an indication of accepting the exchange data, causing via the intermediary database an exchange of the first encrypted speed data for the exchange data comprising the incentive between the first computing device and the second computing device; and
converting the first encrypted speed data to second encrypted speed data via a second encryption key, wherein the converting comprises determining, using the intermediary database, that the exchange of the first encrypted speed data for the exchange data between the first computing device and the second computing device has been finalized;
wherein the second entity associated with the second computing device provides the incentive to the first entity associated with the first computing device when the exchange of the exchange data and the first encrypted speed data between the first computing device and the second computing device is finalized.

2. The method of claim 1, wherein converting the first encrypted speed data to second encrypted speed data via the second encryption key further comprises:
receiving, from the intermediary database, the first encrypted speed data;
decrypting, using the first encryption key, the first encrypted speed data received from the intermediary database to generate decrypted data;
encrypting, using the second encryption key associated with the second computing device, the decrypted data to generate second encrypted speed data;

transmitting, via the intermediary database and to the second computing device, the second encrypted speed data for the second computing device to decrypt and use; and receiving, via the intermediary database, the exchange data.

3. The method of claim 1, wherein the text description is generated further based on user input associated with the sensor data.

4. The method of claim 1, wherein the text description indicates a data type of the sensor data.

5. The method of claim 1, further comprising:
validating, based on one or more of types of the plurality of sensors, manufacturers of the plurality of sensors, or models of the plurality of sensors, the source of the sensor data.

6. The method of claim 1, wherein the intermediary database comprises a block chain.

7. An apparatus comprising:
a processor; and
memory storing computer-executable instructions that, when executed by the processor, cause the apparatus to:
receive, from a plurality of sensors, sensor data, the sensor data comprising speed data;
process the sensor data to generate processed data and a textual description, wherein the process comprises generating the textual description to indicate that the sensor data is validated;
encrypt the processed data by a first encryption key associated with the apparatus to generate first encrypted data, wherein the textual description is not encrypted;
transmit, to an intermediary database, the first encrypted data and the unencrypted textual description;
receive, via the intermediary database and from a second apparatus, a selection of the first encrypted data and indication of exchange data comprising information regarding an incentive as exchange data for the exchange of the first encrypted data, wherein the selection of the first encrypted data was based on identifying, by the second apparatus, the sensor data indicated by the unencrypted textual description;
based on an indication of accepting the exchange data, cause via the intermediary database an exchange of the first encrypted data for the exchange data comprising the incentive between the apparatus and the second apparatus; and
convert the first encrypted data to second encrypted data via a second encryption key, wherein the converting comprises determining, using the intermediary database, that the exchange of the first encrypted data for the exchange data between the first computing device and the second computing device has been finalized
wherein the apparatus is associated with a first entity, the second apparatus is associated with a second entity, and the second entity provides the incentive to the first entity when the exchange of the exchange data and the first encrypted speed data between the apparatus and the second apparatus has been finalized.

8. The apparatus of claim 7, wherein the computer-executable instructions, when executed by the processor, cause the apparatus to convert the first encrypted data to second encrypted data via the second encryption key by causing the apparatus to:

receive, from the intermediary database, the first encrypted data;

decrypt, using the first encryption key, the first encrypted data received from the intermediary database to generate decrypted data;

encrypt, using the second encryption key associated with the second apparatus, the decrypted data to generate second encrypted data;

transmit, via the intermediary database and to the second apparatus, the second encrypted data for the second apparatus to decrypt and use; and receive, via the intermediary database, the exchange data.

9. The apparatus of claim 7, wherein the text description is generated further based on user input associated with the sensor data.

10. The apparatus of claim 7, wherein the text description indicates a data type of the sensor data.

11. The apparatus of claim 7, wherein the computer-executable instructions, when executed by the processor, further cause the apparatus to validate the source of the sensor data based on one or more of types of the plurality of sensors, manufacturers of the plurality of sensors, or models of the plurality of sensors.

12. A non-transitory computer readable medium storing instructions that, when read by a first computing device, cause the first computing device to:
receive, from a plurality of sensors, sensor data, the sensor data comprising speed data;
process the sensor data to generate processed data and a textual description, wherein the process comprises generating the textual description to indicate that the sensor data is validated;
encrypt the processed data by a first encryption key associated with the first computing device to generate first encrypted data, wherein the textual description is not encrypted;
transmit, to an intermediary database, the first encrypted data and the unencrypted textual description;
receive, via the intermediary database and from a second computing device, a selection of the first encrypted data and indication of exchange data comprising information regarding an incentive as exchange data for the exchange of the first encrypted data, wherein the selection of the first encrypted data was based on identifying, by the second computing device, the sensor data indicated by the unencrypted textual description;
based on an indication of accepting the exchange data, cause via the intermediary database an exchange of the first encrypted data for the exchange data comprising the incentive between the first computing device and the second computing device; and
convert the first encrypted data to second encrypted data via a second encryption key, wherein the converting comprises determining, using the intermediary database, that the exchange of the first encrypted data for the exchange data between the first computing device and the second computing device has been finalized;
wherein the first computing device is associated with a first entity, the second computing device is associated with a second entity, and the second entity provides the incentive to the first entity when the exchange of the exchange data and the first encrypted speed data between the first computing device and the second computing device is finalized.

13. The non-transitory computer readable medium of claim 12, wherein the instructions, when read by the first computing device, cause the first computing device to convert the first encrypted data to second encrypted data via the second encryption key by causing the first computing device to:
- receive, from the intermediary database, the first encrypted data;
- decrypt, using the first encryption key, the first encrypted data received from the intermediary database to generate decrypted data;
- encrypt, using the second encryption key associated with the second computing device, the decrypted data to generate second encrypted data;
- transmit, via the intermediary database and to the second computing device, the second encrypted data for the second computing device to decrypt and use; and
- receive, via the intermediary database, the exchange data.

14. The non-transitory computer readable medium of claim 12, wherein the text description is generated further based on user input associated with the sensor data.

15. The non-transitory computer readable medium of claim 12, wherein the text description indicates a data type of the sensor data, and
- the data type of the sensor data comprises one or more of acceleration data, speed data, location data, data indicating hard braking, or driver risk score data.

* * * * *